(12) United States Patent
Ho

(10) Patent No.: US 7,130,470 B1
(45) Date of Patent: Oct. 31, 2006

(54) SYSTEM AND METHOD OF CONTEXT-BASED SORTING OF CHARACTER STRINGS FOR USE IN DATA BASE APPLICATIONS

(75) Inventor: Ching Lan Ho, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 977 days.

(21) Appl. No.: 10/099,422

(22) Filed: Mar. 15, 2002

(51) Int. Cl.
*G06K 9/72* (2006.01)
*G06K 9/18* (2006.01)
*G06F 7/00* (2006.01)

(52) U.S. Cl. .......................... 382/229; 382/185; 707/7

(58) Field of Classification Search ................ 382/229, 382/185; 707/7
See application file for complete search history.

(56) References Cited

U.S. PATENT DOCUMENTS

| | | | | |
|---|---|---|---|---|
| 4,939,639 A * | 7/1990 | Lee et al. | ...................... | 707/7 |
| 5,020,117 A * | 5/1991 | Ooi et al. | .................... | 382/185 |
| 5,060,146 A * | 10/1991 | Chang et al. | .................. | 707/7 |
| 5,148,541 A * | 9/1992 | Lee et al. | ...................... | 707/2 |
| 5,606,690 A * | 2/1997 | Hunter et al. | ................... | 707/5 |
| 5,675,818 A * | 10/1997 | Kennedy | ....................... | 704/8 |
| 5,784,071 A * | 7/1998 | Tang et al. | ................. | 345/467 |
| 5,873,111 A * | 2/1999 | Edberg | ....................... | 715/536 |
| 6,097,841 A * | 8/2000 | Gunji et al. | ................ | 382/229 |
| 6,502,064 B1 * | 12/2002 | Miyahira et al. | ............. | 704/7 |
| 6,563,956 B1 * | 5/2003 | Satoh et al. | ................ | 382/245 |
| 6,678,415 B1 * | 1/2004 | Popat et al. | ................ | 382/226 |
| 6,873,986 B1 * | 3/2005 | McConnell et al. | ........... | 707/7 |

* cited by examiner

*Primary Examiner*—Bhavesh M. Mehta
*Assistant Examiner*—Utpal Shah

(57) ABSTRACT

A method and system for context-based sorting of character strings. A first sorting weight of a current character of a character string is determined from a first table. The first sorting weight is stored. Provided the current character is a predetermined character, a second table is accessed. A second sorting weight of the current character is determined from the location of a preceding character within the second table. The first sorting weight is replaced with the second sorting weight for the current character. Embodiments of the present invention provide an efficient method of context-based sorting in languages, such as Japanese, where the sorting weight of a character can be altered by the preceding character.

40 Claims, 6 Drawing Sheets

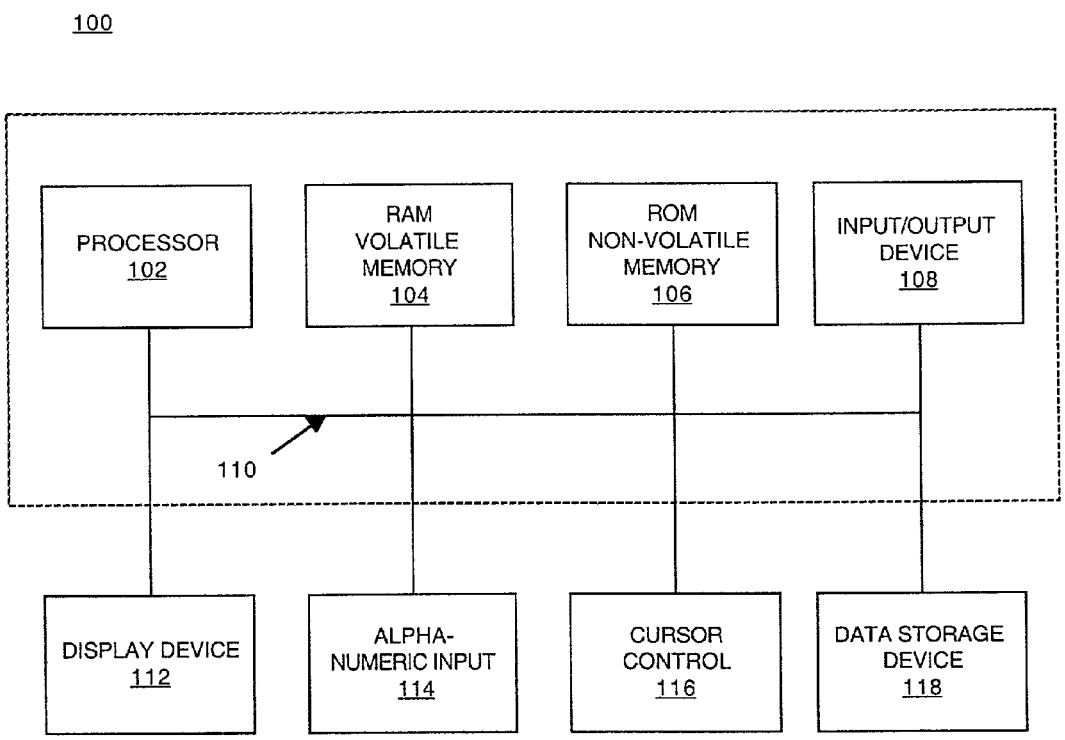

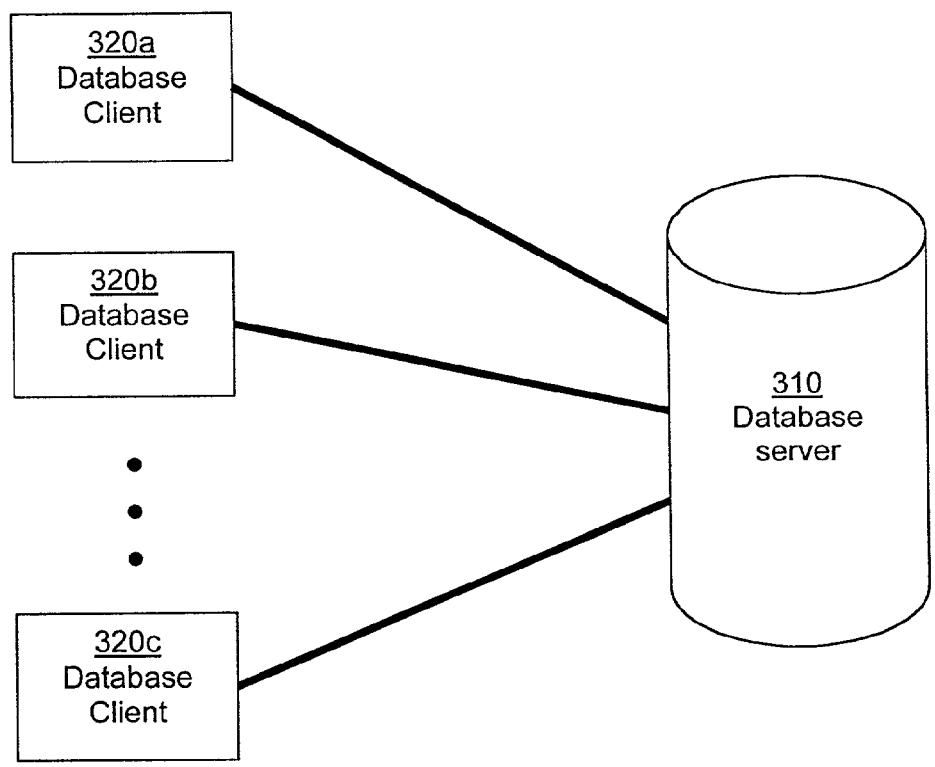

SYSTEM AND METHOD OF CONTEXT-BASED SORTING OF CHARACTER STRINGS FOR USE IN DATA BASE APPLICATIONS

FIELD OF INVENTION

The present invention relates to the field of database applications. Specifically, the present invention relates to a system and method of context-based sorting of character strings.

BACKGROUND OF THE INVENTION

As a business or organization expands, there is a greater need for effective management of data and records. A vast number of businesses and organizations use computer databases to collect and organize their data and records. A database is a collection of information organized in such a way that a computer program can access desired pieces of data. One of the ways in which databases are particularly useful is that records can be sorted in any number of ways. One common sort order is alphabetic, for example by last name of a purchaser or by a business name.

Sort orders vary from language to language, and many specifications require variations. For example, in traditional German (e.g., Æ and Œ) and Spanish (e.g., ch or ll), one character may compare as if it were two, or two characters may compare as if they were one character. This is commonly referred to as multiple mapping. In most languages, multiple mapping characters are sorted alphabetically as if they were two characters. In other words, in most languages multiple mapping characters are alphabetically ordered as if they were two characters (e.g., Æ is ordered as if it were the letters A and E).

However, in some languages, the definition of a character can be altered by the preceding character in the word or character string. For example, in Japanese (in both Hiragana and Katakana character sets), a length mark lengthens the vowel of the preceding character. The length mark can be depicted three ways: as a full-width length mark (FIG. 1A), as a half-width length mark (FIG. 1B) and as a dash (FIG. 1C). Depending on the vowel of the preceding character, the length mark will sort in a different alphabetic order. For example, after the character "ka" (FIG. 1D), the length mark indicates a long "a" and comes alphabetically after the character "a" (FIG. 1E) rather than before. In another example, after the character "ki" (FIG. 1F), the length mark indicates a long "i" and comes alphabetically after the character "i" (FIG. 1G) rather than before.

In current multilingual database architectures, Unicode is often used to depict characters. Unicode is a superset of the ASCII character set that uses two bytes for each character rather than one. Because Unicode is able to handle 65,536 character combinations rather than just 256, it can house the alphabets of most of the world's languages. Unicode is a desirable character set because it easily enables a database user to enter in records in a number of different languages.

In one current database architecture, alphabetic sort orders are performed by determining a character's sort weight by accessing a collation weight table. A collation weight table provides a numerical value for a character for sorting. For example, in a collation weight table the letter "A" may have a sorting weight of 10 and the letter "B" may have a sorting weight of 15. When the sort order performs the sort, "A" will be ordered before "B" because it has a smaller value. The collation weight table can have a sort weight for every Unicode character, thus allowing for sorting in multiple languages.

Occasionally, there are situations where the collation weight table cannot be used to determine the sort weight of a character. As described above, one character may compare as if it were two characters or two characters may compare as if they were one character. To account for this behavior of certain characters, the collation weight table will refer to a multiple mapping table to determine the ordering of these characters. Accessing the multiple mapping table requires extra processing time, but because only a small percentage of characters in most languages reside in the multiple mapping table, the extra processing time is typically nominal.

However, in performing Japanese character alphabetic sort orders, the processing time is substantial. To account for the effect a length mark (FIGS. 1A–C) has on a character, it is necessary to look ahead to the next character. Current database management systems accomplish this by referring to the multiple mapping table for every Japanese character. As a result, the processing time is effectively doubled for each character. The increased processing time reduces the efficiency of an alphabetic sort order. As several thousand or millions of records can be sorted using a Japanese alphabetic sort order, users are subject to substantial time requirements to perform Japanese alphabetic sort orders.

SUMMARY OF THE INVENTION

Accordingly, a need exists for a method or system that provides for context-based sorting of character strings that is more efficient in processing Japanese language (both Hiragana and Katakana) character strings. In particular, a need exists for a method or system that satisfies the above need, and does not need to look ahead to the next character of a character string. A need also exists for a method or system that satisfies the above needs and does not need to always access a multiple mapping table.

A method and system for context-based sorting of character strings is described herein. A first sorting weight of a current character of a character string is determined from a first table. In one embodiment, the first table is a collation weight table. The first sorting weight from the collation weight table is stored.

It is determined whether the current character is a context-sensitive character. Provided the current character is a context-sensitive character, a second table is accessed. In one embodiment, the second table is a Japanese-context sensitive table. In another embodiment, the second table is a multiple mapping table. A second sorting weight of the current character is determined by locating the preceding character from the second table. The first sorting weight is replaced with the second sorting weight for the current character.

Embodiments of the present invention are directed to character strings comprised of Unicode characters. In one embodiment, the present invention provides a method and system for context-based sorting of Japanese character strings. In one embodiment, the predetermined character is a length mark.

In one embodiment, the preceding character is located in the second table by directly accessing the preceding character. In another embodiment, the preceding character is located in the second table by performing a binary search. In another embodiment, the preceding character is located in the second table by performing a modified binary search for narrowing a search range.

Embodiments of the present invention provide an efficient method of context-based sorting in languages, such as Japanese, where the sorting weight of a character can be altered by the preceding character. Embodiments of the present invention also provide a method of context-based sorting that does not need to look ahead to the next character of a character string and does not need to always access a multiple mapping table.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 1A through 1G are illustrations of Japanese characters.

FIG. 2 is a block diagram of an exemplary computer system upon which embodiments of the present invention may be practiced.

FIG. 3 is a block diagram of an exemplary database server having a plurality of database clients, upon which embodiments of the present invention may be practiced.

DETAILED DESCRIPTION

Figure 4:
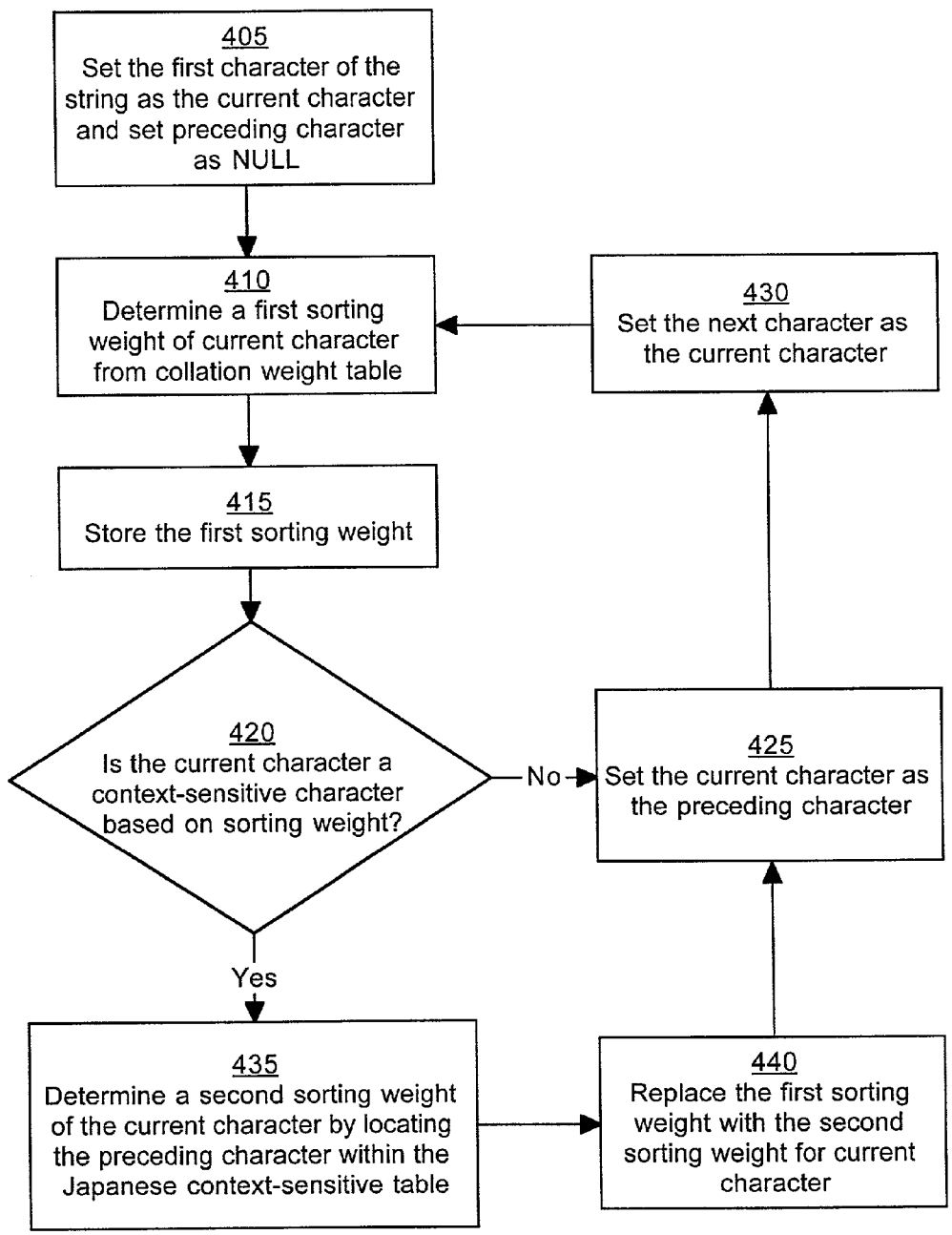
FIG. 4 is flowchart illustrating steps of a process of context-based sorting of character strings in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "determining" or "storing" or "accessing" or "locating" or "replacing" or "performing" or "sorting" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Hardware in Accordance with the Present Invention

Portions of the present invention are comprised of computer-readable and computer executable instructions which reside, for example, in computer-usable media of a computer system. FIG. 2 is a block diagram of one embodiment of an exemplary computer system 100 used in accordance with the present invention. It should be appreciated that system 100 is not strictly limited to be a computer system. As such, system 100 of the present embodiment is well suited to be any type of computing device (e.g., server computer, portable computing device, desktop computer, etc.). Within the following discussions of the present invention, certain processes and steps are discussed that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior which is described in detail below.

Computer system 100 of FIG. 2 comprises an address/data bus 110 for communicating information, one or more central processors 102 coupled with bus 110 for processing information and instructions. Central processor unit(s) 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices 108 coupled with bus 110 for enabling system 100 to interface with other electronic devices and computer systems. The communication interface(s) 108 of the present embodiment may include wired and/or wireless communication technology. For example, within the present embodiment, the communication interface 108 is a wireless communication port, but could also alternatively be any of a number of well known communication standards and protocols, e.g., serial communication port, Universal Serial Bus (USB), Ethernet, FireWire (IEEE 1394), parallel, small computer system interface (SCSI), infrared (IR) communication, Bluetooth wireless communication, broadband, and the like.

Optionally, computer system 100 may include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The cursor directing device 116 can be implemented using a number of well known devices such as a mouse, a track-ball, a track-pad, an optical tracking device, a touch screen, etc. Alternatively, it is appreciated that a cursor can be directed and/or activated via input from the alphanumeric input device 114 using special keys and key sequence commands. The present embodiment is also well suited to directing a cursor by other means such as, for example, voice commands. The system 100 can also include a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Portions of the present invention are comprised of computer-readable and computer executable instructions which reside, for example, in computer-usable media of a database system. FIG. 3 is a block diagram of an exemplary database system 300 comprising a database server 310 having a plurality of database clients 320a–c, upon which embodiments of the present invention may be practiced.

Method of Context-Based Sorting of Character Strings

FIG. 4 is flowchart illustrating steps of a process 400 of context-based sorting of character strings in accordance with an embodiment of the present invention. In one embodiment, process 400 is carried out by processors and electrical components under the control of computer readable and computer executable instructions. The computer readable and computer executable instructions reside, for example, in data storage features such as a computer usable volatile memory unit 104 and/or computer usable non-volatile memory unit 106 of computer system 100 of FIG. 2. However, the computer readable and computer executable instructions may reside in any type of computer readable medium. Although specific steps are disclosed in process 400, such steps are exemplary. That is, the present invention is well suited to performing various other steps or variations of the steps recited in FIG. 4.

At step 405 of process 400, the first character of a character string (e.g., a word) is accessed. The first character is set as the current character for purposes process 400. The preceding character is set as NULL because the current character is currently the first character of the character string. For purposes of understanding, the current character refers to the character of the character string currently having its sorting weight determined by process 400 and the preceding character refers to the character having its sorting weight determined immediately prior to the current character. The terms "current character" and "preceding character" are used to describe relative positions of characters of a character string.

In one embodiment, the character string is not comprised of characters having Unicode encoding. In one embodiment, the character string is comprised of Japanese characters (e.g., Hiragana and Katakana). Provided the current character does not have Unicode encoding, the current character is converted to Unicode. In another embodiment, the character string is comprised of Unicode characters.

At step 410 of process 400, a first sorting weight (e.g., a key) of the current character of the character string is determined. For purposes of alphabetic sorting, character strings are sorted first according to a first character, then by a second character, and so on.

In one embodiment, the first sorting weight of the current character is determined from a first table. In one embodiment, the first table is a collation weight table. In one embodiment, the collation weight table comprises sorting weights for all Unicode characters, wherein a sorting weight is used for sorting characters and character strings.

At step 415, the first sorting weight is stored. In one embodiment, the first sorting weight is stored in volatile memory of a computer system or non-volatile memory of a computer system (e.g., computer usable volatile memory unit 104 or computer usable non-volatile memory unit 106 of computer system 100 of FIG. 2).

At step 420, it is determined whether the current character is a context-sensitive (e.g., predetermined) character based on the sorting weight from the first table. In one embodiment, the context-sensitive character is a Japanese length mark (e.g., length marks of FIGS. 1A–C).

Provided the current character is not a context-sensitive character, process 400 proceeds to step 425. At step 425, process 400 sets the current character as the preceding character.

At step 430, process 400 sets the next character of the character string as the current character. Provided the current character is not a Unicode character, the current character is converted to Unicode.

Conversely, provided the current character is a context-sensitive character based on the sorting weight from the first table, process 400 proceeds to step 435. At step 435, a second table is accessed. In one embodiment, the second table is a Japanese context sensitive table. In another embodiment, the second table is a multiple mapping table. For purposes of illustrating embodiments of the present patent application, the second table is referred to herein as a Japanese context sensitive table. However, it should be appreciated that the second table can be another table used for assigning sorting weights.

Figure 5:
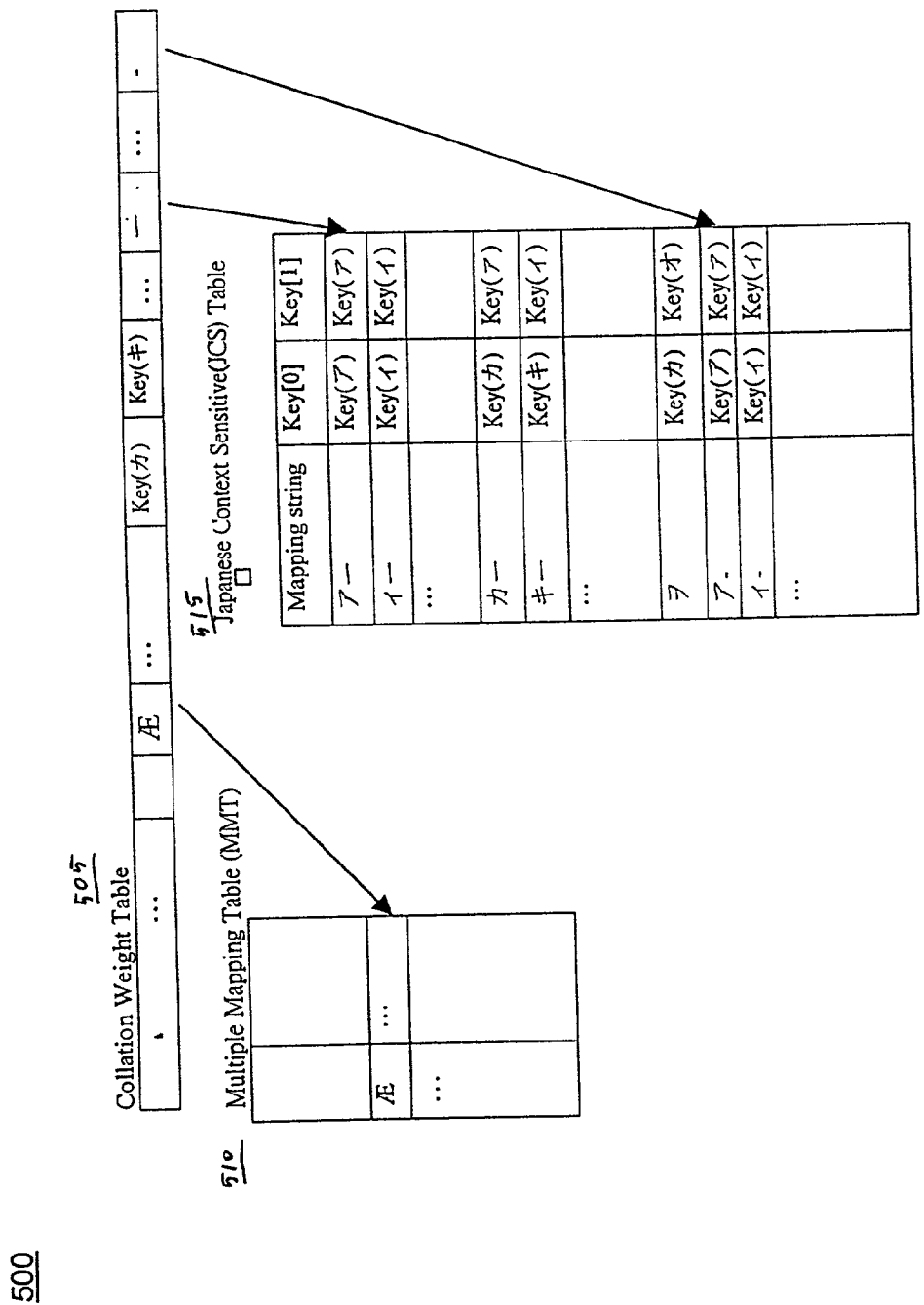
FIG. 5 illustrates a collation weight table, a multiple mapping table and a Japanese context sensitive table in accordance with one embodiment of the present invention.

FIG. 5 illustrates a collation weight table 505, a multiple mapping table 510, and a Japanese context sensitive table 515 in accordance with one embodiment of the present invention. In one embodiment, collation weight table 505 comprises Unicode characters. When a character is accessed for purposes of determining its sorting weight, collation weight table 505 provides the sorting weight. In some situations, collation weight table 505 redirects the sorting weight determination to a second table. In one embodiment, collation weight table 505 redirects the sorting weight determination to multiple mapping table 510. In another embodiment, collation weight table 505 redirects the sorting weight determination to Japanese context sensitive table 515.

Japanese context sensitive table 515 comprises entries of Japanese characters, and their associated collation sorting weights. In one embodiment, the Japanese context sensitive table provides the sorting weight for each character as it is modified by the length mark. It should be appreciated that there are a number of Hiragana and Katakana characters wherein the next character can be a length mark. In one embodiment, there are 121 possible Hiragana and Katakana characters that can precede a length mark.

Figure 6:
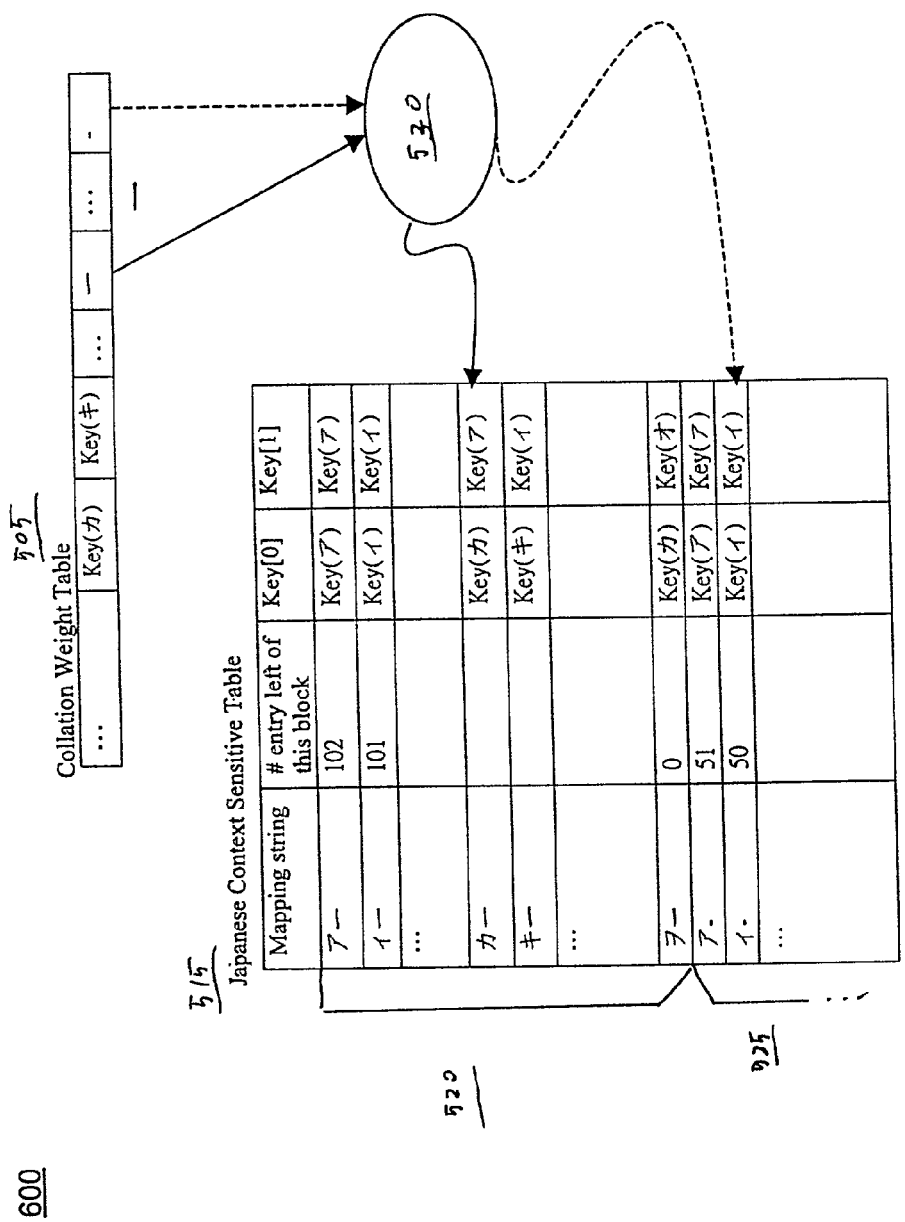
FIG. 6 illustrates a collation weight table and a Japanese context sensitive table having a plurality of blocks in accordance with one embodiment of the present invention.

In one embodiment, as illustrated in FIG. 6, Japanese context sensitive table 515 comprises a plurality of blocks (e.g., blocks 520 and 525), wherein each block comprises a set of all Hiragana and Katakana characters. In the present embodiment, a block is used to distinguish between different depictions of the length marks (e.g., full-width length mark of FIG. 1A, half-width length mark of FIG. 1B and dash of FIG. 1C). Each length mark depiction requires its own block. For example, block 520 comprises Japanese characters followed by a full-width length mark and block 525 comprises Japanese characters followed by a half-width length mark. In one embodiment, Japanese context sensitive table 515 comprises 363 Japanese characters, wherein there are three blocks of 121 Japanese characters, wherein each block is associated with one depiction of the length mark character.

It should be appreciated, Japanese context sensitive table 515, or any block therein, can be comprised of any number of Japanese characters or customized characters. In one embodiment, Japanese context sensitive table 515 can be customized, allowing a user to add or remove characters. As such, Japanese context sensitive table 515 can comprise any number of characters.

With reference to step 435 of FIG. 4, the sorting weight of the current character is determined by locating the preceding character with the Japanese context sensitive table. In one embodiment, the Japanese context sensitive table comprises a plurality of blocks. In the present embodiment, the block associated with the corresponding length mark (e.g., the depiction of the length mark that is the current character) is located.

In one embodiment, the preceding character is located by direct access. For example, where the preceding character is the twentieth Japanese character, the preceding character is located by going to the twentieth entry of the corresponding block of the Japanese context sensitive table.

In another embodiment, the preceding character is located by performing a binary search. Where the Japanese context sensitive table has been customized, directly accessing the preceding character may not be possible. For example, where characters have been removed or added from the Japanese context sensitive table, the preceding character may not be in the expected entry. For further illustration, where the preceding character is the twentieth Japanese character, and characters have been added or removed from the Japanese context sensitive table, the preceding character may not be in the twentieth entry of the corresponding block of the Japanese context sensitive table.

A binary search is a way of locating an entry in a table. The desired entry is compared to the entry in the middle of the table. If the desired entry is less than the middle entry, the binary search is repeated for the first half of entries of the table. Likewise, if the desired entry is greater than the middle entry, the binary search is repeated for the second half of entries of the table. If the desired entry is the middle entry, the entry is located. The binary search is repeated until the preceding character is located.

In another embodiment, the preceding character is located by performing a modified binary search for narrowing a search range. As described above, a binary search is a way of locating an entry in a table. However, a binary search always uses the middle entry of a group of entries to begin a search. In a modified binary search, the starting point is a defined entry.

In one embodiment, the defined entry is determined by multiplying the expected entry of the preceding character (e.g., twenty if the preceding character is the twentieth Japanese character) by the density of the Japanese context sensitive table. The density is determined according to Equation 1 below:

$$\text{density} = \frac{\text{number of characters in the block}}{\text{high codepoint of the block} - \text{low codepoint of the block}} \quad \text{Equation 1}$$

wherein the high codepoint and low codepoint are Unicode values. Multiplying the expected entry of the preceding character by the density results in an estimated location of the preceding character. The estimated location of the preceding character may not be the actual location of the preceding character, but it will typically be closer than the middle entry as selected in the binary search as described above.

As illustrated in FIG. 6, search 530 is performed when an entry on collation weight table 505 redirects the sorting weight determination to Japanese context sensitive table 515. In one embodiment, search 530 is directly accessing the preceding character. In another embodiment, search 530 is a binary search. In another embodiment, search 530 is a modified binary search for narrowing a search range.

With reference to FIG. 4, at step 435, a second sorting weight for the current character is determined based on the location of the preceding within the Japanese context sensitive table. The second sorting weight is determined by accessing the preceding character within the Japanese context sensitive table.

At step 440, the first sorting weight is replaced with the second sorting weight for the current character. In one embodiment, the second sorting weight is stored in volatile memory of a computer system or non-volatile memory of a computer system (e.g., computer usable volatile memory unit 104 or computer usable non-volatile memory unit 106 of computer system 100 of FIG. 2). Process 400 then proceeds to step 425.

Embodiments of the present invention provide an efficient method of context-based sorting in languages, such as Japanese, where the sorting weight of a character can be altered by the preceding character. Embodiments of the present invention also provide a method where sorting weights of Japanese characters can be directly accessed from a collation weight table, limiting the need to redirect a sorting weight determination to a second table. Embodiments of the present invention also provide a method of context-based sorting that does not need to look ahead to the next character of a character string and does not need to always access a multiple mapping table, thereby saving time and increasing efficiency. The present invention eliminates the extra time required in traditional sorting of Hiragana and Katakana characters.

The preferred embodiment of the present invention, a system and method of context-based sorting of character strings, is thus described. While the present invention has been described in particular embodiments, it should be appreciated that the present invention should not be construed as limited by such embodiments, but rather construed according to the below claims.

What is claimed is:

1. A method for context-based sorting of character strings, said method comprising:
   a) determining a first sorting weight of a current character of a character string from a first table;
   b) storing said first sorting weight;
   c) provided said current character is a predetermined character, locating a preceding character within a second table, said preceding character directly preceding said current character within said character string;
   d) determining a second sorting weight of said current character based on location of said preceding character within said second table; and
   e) replacing said first sorting weight with said second sorting weight for said current character.

2. A method as recited in claim 1 wherein said character string is comprised of Japanese characters.

3. A method as recited in claim 2 wherein said predetermined character is a length mark.

4. A method as recited in claim 1 wherein said current character and preceding character are Unicode characters.

5. A method as recited in claim 1 wherein said first table is a collation weight table.

6. A method as recited in claim 1 wherein said second table is a Japanese-context sensitive table.

7. A method as recited in claim 1 wherein said second table is a multiple mapping table.

8. A method as recited in claim 1 wherein said c) comprises directly locating said preceding character.

9. A method as recited in claim 1 wherein said c) comprises performing a binary search.

10. A method as recited in claim 1 wherein said c) comprises performing a modified binary search for narrowing a search range.

11. A computer system comprising:
    a bus;
    a display device coupled to said bus;
    a memory unit coupled to said bus, and
    a processor coupled to said bus, said processor for executing a method for context-based sorting of character strings, said method comprising:
    a) determining a first sorting weight of a current character of a character string from a first table;
    b) storing said first sorting weight;
    c) provided said current character is a predetermined character, locating a preceding character within a second table, said preceding character directly preceding said current character within said character string;
    d) determining a second sorting weight of said current character based on location of said preceding character within said second table; and
    e) replacing said first sorting weight with said second sorting weight for said current character.

12. A computer system as recited in claim 11 wherein said character string is comprised of Japanese characters.

13. A computer system as recited in claim 12 wherein said predetermined character is a length mark.

14. A computer system as recited in claim 11 wherein said current character and said preceding character are Unicode characters.

15. A computer system as recited in claim 11 wherein said first table is a collation weight table.

16. A computer system as recited in claim 11 wherein said second table is a Japanese-context sensitive table.

17. A computer system as recited in claim 11 wherein said second table is a multiple mapping table.

18. A computer system as recited in claim 11 wherein said c) comprises directly locating said preceding character.

19. A computer system as recited in claim 11 wherein said c) comprises performing a binary search.

20. A computer system as recited in claim 11 wherein said c) comprises performing a modified binary search for narrowing a search range.

21. A computer-usable medium having computer-readable program code embodied therein for causing a computer system to perform a method for context-based sorting of character strings, said method comprising:
    a) determining a first sorting weight of a current character of a character string from a first table;
    b) storing said first sorting weight;
    c) provided said current character is a predetermined character, locating a preceding character within a second table, said preceding character directly preceding said current character within said character string;
    d) determining a second sorting weight of said current character based on location of said preceding character within said second table; and
    e) replacing said first sorting weight with said second sorting weight for said current character.

22. A computer-usable medium as recited in claim 21 wherein said character string is comprised of Japanese characters.

23. A computer-usable medium as recited in claim 22 wherein said predetermined character is a length mark.

24. A computer-usable medium as recited in claim 21 said current character and said preceding character are Unicode characters.

25. A computer-usable medium as recited in claim 21 wherein said first table is a collation weight table.

26. A computer-usable medium as recited in claim 21 wherein said second table is a Japanese-context sensitive table.

27. A computer-usable medium as recited in claim 21 wherein said second table is a multiple mapping table.

28. A computer-usable medium as recited in claim 21 wherein said c) comprises directly locating said preceding character.

29. A computer-usable medium as recited in claim 21 wherein said c) comprises performing a binary search.

30. A computer-usable medium as recited in claim 21 wherein said c) comprises performing a modified binary search for narrowing a search range.

31. A system for context-based sorting of character strings, said system comprising:
    means for determining a first sorting weight of a current character of a character string from a first table;
    means for storing said first sorting weight;
    means for locating a preceding character within a second table, said preceding character directly preceding said current character within said character string, said means for locating a preceding character within a second table operable provided said current character of said character string is a predetermined character;
    means for determining a second sorting weight of said current character based on location of said preceding character within said second table; and
    means for replacing said first sorting weight with said second sorting weight for said current character.

32. A system as recited in claim 31 wherein said character string is comprised of Japanese characters.

33. A system as recited in claim 32 wherein said predetermined character is a length mark.

34. A system as recited in claim 31 wherein said current character and said preceding character are Unicode characters.

35. A system as recited in claim 31 wherein said first table is a collation weight table.

36. A system as recited in claim 31 wherein said second table is a Japanese-context sensitive table.

37. A system as recited in claim 31 wherein said second table is a multiple mapping table.

38. A system as recited in claim 31 wherein said means for locating said preceding character within said second table comprises means for directly locating said preceding character.

39. A system as recited in claim 31 wherein said means for locating said preceding character within said second table comprises means for performing a binary search.

40. A system as recited in claim 31 wherein said means for locating said preceding character within said second table comprises means for performing a modified binary search for narrowing a search range.

* * * * *